(12) United States Patent
Anker et al.

(10) Patent No.: US 7,646,717 B1
(45) Date of Patent: Jan. 12, 2010

(54) METHOD AND APPARATUS FOR PACKET SCHEDULING

(75) Inventors: Tal Anker, Modiim (IL); Tasahi Daniel, Tel-Aviv (IL)

(73) Assignee: Marvell International Ltd., Hamilton (BM)

( * ) Notice: Subject to any disclaimer, the term of this patent is extended or adjusted under 35 U.S.C. 154(b) by 760 days.

(21) Appl. No.: 10/977,245

(22) Filed: Oct. 29, 2004

(51) Int. Cl.
*H01R 31/08* (2006.01)

(52) U.S. Cl. ............... 370/235; 370/395.4; 370/412; 370/429

(58) Field of Classification Search ......... 370/395, 370/395.4, 412, 429, 235
See application file for complete search history.

(56) References Cited

U.S. PATENT DOCUMENTS

| | | | | |
|---|---|---|---|---|
| 5,956,340 | A * | 9/1999 | Afek et al. | 370/412 |
| 6,032,218 | A | 2/2000 | Lewin et al. | 710/240 |
| 6,101,193 | A * | 8/2000 | Ohba | 370/429 |
| 6,470,016 | B1 * | 10/2002 | Kalkunte et al. | 370/395.41 |
| 6,516,369 | B1 | 2/2003 | Bredin | 710/111 |
| 6,553,035 | B1 * | 4/2003 | Schwartz et al. | 370/412 |
| 6,647,449 | B1 | 11/2003 | Watts | 710/111 |
| 7,324,536 | B1 * | 1/2008 | Holtey et al. | 370/412 |
| 2003/0120705 | A1 | 6/2003 | Chen et al. | 709/104 |
| 2003/0229742 | A1 | 12/2003 | Moss | 710/111 |
| 2004/0013089 | A1 * | 1/2004 | Taneja et al. | 370/235 |
| 2004/0111541 | A1 * | 6/2004 | Meyer et al. | 710/52 |
| 2004/0156376 | A1 * | 8/2004 | Nakagawa | 370/412 |
| 2008/0056268 | A1 * | 3/2008 | Washburn et al. | 370/394 |

OTHER PUBLICATIONS

G. Chuanxiong, "SRR: An O(1) Time Complexity Packet Scheduler for Flows in Multi-Service Packet Networks", SIGCOMM '01, Aug. 2001.
M. Shreedhar, et al., "Efficient Fair Queuing using Deficit Round Robin", ACM SIGCOMM '95, Aug. 1995.
A.K. Parekh, et al., "A Generalized Processor Sharing Approach to Flow Control in Integrated Services Networks: The Single-Node Case", IEEE/ACM Transactions on Networking, vol. 1, No. 3, Jun. 1993.
K. Li, et al., "A Rate-Matching Packet Scheduler for Real-Rate Applciations", Proc. SPIE vol. 4312, Multimedia Computing and Networking 2001, Dec. 2000, pp. 49-61.
A. Demers, et al., "Analysis and Simulation of a Fair Queuing Algorithm", Computer Communication Review, vol. 19, No. 4, Austin, TX, Sep. 1989, pp. 1-12.
N.R. Figueira et al., "Leave-in-Time: A New Service Discipline for Real-Time Communications in a Packet-Switching Network", SIGCOMM '95, 1995.
A. Hari et al, "An Architecture for Packet-Striping Protocols", ACM Transactions on Computer Systems, vol. 17, No. 4, Nov. 1999, pp. 249-287.
X. Yuan et al., "FRR: a Proportional and Worst-Case Fair Round Robin Scheduler", Report, TR-04020, Department of Computer Science, Florida State University, Tallahassee, FL (2004).

(Continued)

*Primary Examiner*—Seema S Rao
*Assistant Examiner*—Sai-Ming Chan (57) ABSTRACT

A methods, apparatus and computer memory are provided for packet scheduling. A processor polls queues in a round robin fashion and schedules for transmission onto a link a packet in each queue with no deficit before scheduling for transmission onto the link a packet in each queue with a deficit. A credit is allocated to each queue with the deficit based on a proportional weight, until each queue with the deficit has a credit.

27 Claims, 4 Drawing Sheets

OTHER PUBLICATIONS

J. Bennett et al., "WF$^2$Q: Worst-case Fair Weighted Fair Queuing", IEEE INFOCOM '96, 1996.

H. Shi et al., "An Evaluation of Timestamp-Based Packet Schedulers Using a Novel Measure of Instantaneous Fairness", Proceedings of the IEEE International Performance, Computing, and Communications Conference, Phoenix, Arizona, Apr. 9-11, 2003.

S. Ramabhadran et al., "Stratified Round Robin: A Low Complexity Packet Scheduler with Bandwidth Fairness and Bounded Delay", SIGCOMM '03, Aug. 25-29, 2003.

R. R. Kompella et al., "Reduced State Fair Queuing for Edge and Core Routers", NOSSDAV '04, Jun. 16-18, 2004.

* cited by examiner

METHOD AND APPARATUS FOR PACKET SCHEDULING

BACKGROUND OF THE INVENTION

1. Field of the Invention

The present invention relates to network communication systems, and in particular to packet scheduling.

2. Description of the Related Art

Network applications, such as video-conferencing and multimedia broadcasts, place large amounts of data on a network, thereby causing contention for network resources. Conventionally, such applications rely on packet scheduling algorithms in gateways to enhance performance and provide an acceptable level of quality of service. A packet scheduler controls the allocation of network interface bandwidth with respect to outgoing network flows, by deciding which packet is sent at a given time. In so doing, a packet scheduler determines how bandwidth is shared among flows and plays a key role in determining the rate and timing behavior of the transmission of data. A desirable and important property of a packet scheduler is the fairness it achieves in the allocation of the bandwidth resources on the output flow. The most commonly used notion of fairness is that no flow should receive more service than it demands and that no flow with an unsatisfied demand should receive less service than any other flow. The well known Generalized Processor Sharing (GPS) scheduler, described in A. Parekh and R. Gallager, "A Generalized Processor Sharing Approach to Flow Control in Integrated Services Network," IEEE Transactions on Networking," vol. 1, no. 3, June 1993, purports to provide an ideally fair scheduling algorithm. However, while GPS may provide an ideal method for best-effort and interactive connections in a theoretical sense, it is impossible to implement due to its requirement of infinitesimal sized packets. It is not, therefore, a practical solution.

Practical packet schedulers can be classified broadly as either timestamp schedulers or round-robin schedulers. Timestamp schedulers attempt to emulate the operation of GPS by computing a timestamp for each packet. Packets are then transmitted in increasing order of their timestamps. Well-known examples of timestamp scheduling algorithms were introduced by J. Bennet and H. Zhange, in "$WF^2Q$: Worst case fair weighted fair queuing," IEEE INFOCOM '96 (1996); N. Figueira and J. Pasquale, in "Leave-in-time: A new service discipline for real-time communications in a packet-switching network," ACM SIGCOMM '95 (1995) and A. Demers, S. Keshav and S. Shenker, in "Analysis and simulation of a fair queuing algorithm," Internet Res. and Exper., vol. 1, 1990. In general, although timestamp schedulers have good delay properties, they suffer from a sorting bottleneck that results in time complexities (i.e., work) of O(N) to O(log N), where N is the number of competing flows. In addition, the implementation of timestamp schedulers requires a complicated data structure that typically is not well suited for hardware implementation.

Round-robin schedulers are the other broad class of packet schedulers. These schedulers typically assign time slots to flows in a round-robin fashion. By eliminating the sorting bottleneck associated with timestamp schedulers, they can achieve a O(1) time complexity. Deficit Round Robin (DRR) is a well-known example of a round-robin scheme. DRR is described in M. Shreedhar and G. Varghese, "Efficient Fair Queuing using Deficit Round Robin," ACM SIGCOMM, August 1995, incorporated herein by reference. In DRR, each flow is assigned a quantum that is proportional to the weight of the flow. Packets are transmitted in rounds, where a targeted amount of data of a flow to be transmitted in each round is the quantum of the flow. Due to the granularity of packet size, the amount of data transmitted in a round may not be exactly equal to the quantum. A deficit counter is associated with each flow to record the unused quantum. This allows the unused quantum to be passed to the next round. Once a flow is serviced, it will wait until next round to transmit data. Since all data of a flow to be transmitted in a round is transmitted at once, DRR has poor delay and burstiness properties, especially for flows with large weights.

The Smoothed Round Robin (SRR) scheme described in Guo Chuanxiong, "SRR: An O(1) Time Complexity Packet Scheduler for Flows in Multi-Service Packet Networks," Proc. SIGCOMM 2001, incorporated herein by reference, improves the delay and burstiness problems by spreading the data of a flow to be transmitted in a round over the entire round using a specially designed sequence that can distribute output traffic of each flow evenly. SRR has short-term fairness and certain schedule delay bound, as well as O(1) time complexity. A Weight Spread Sequence (WSS) and a Weight Matrix are used as two key data structures of the scheduler. WSS is a specially designed sequence that can distribute the output traffic of each flow evenly. SRR codes the weights of the flows into binary vectors to form a Weight Matrix, and then uses the corresponding WSS to scan the Weight Matrix. Although SRR results in better delay bounds than DRR, the worst case delay experienced by a packet is still proportional to N, the number of flows. In addition, SRR, like timestamp scheduling, is not simple to implement.

Plainly, the prior art scheduling techniques have significant drawbacks, and can often result in large queuing delays during busy periods. Even with the large buffers provided in today's gateway products, queues can become congested. During congestion periods, the buffers may become and remain close to full, subjecting packets to long delays, even when the intrinsic latency of a communications path is relatively small. Even worse, packets might be dropped.

Accordingly, there is a need for an improved packet scheduler which achieves fair allocation of the bandwidth resources on the output link, reduces congestion and lowers packet losses. There also is a need for a packet scheduler that has low complexity and is amenable to a simple hardware implementation.

SUMMARY

It is an object of the present invention to provide an improved packet scheduler, which achieves fair allocation of the bandwidth resources on the output link, reduces congestion and lowers packet losses. It is also an object of the present invention to provide a packet scheduler that has low complexity and is amenable to a simple hardware implementation.

One embodiment of the present invention provides a packet scheduling device including queues adapted to store packets to be transmitted onto a link. A processor updates a credit or deficit value corresponding to each queue as follows: For each queue having a corresponding credit value, when the packet length is greater than the credit value, the processor subtracts the credit value from the packet length and replaces the credit value with the result. When the packet length is smaller than the credit value, the processor subtracts the packet length from the credit value and replaces the credit value with the result. For each queue having a corresponding deficit value, the processor adds the deficit value to the packet length and replaces the deficit value with the result.

Another embodiment of the present invention provides a packet scheduling device including a processor adapted to poll a plurality of queues in a round robin fashion and schedule for transmission onto a link a packet in each queue with no deficit before scheduling for transmission onto the link a packet in each queue with a deficit. The processor also is adapted to allocate a credit to each queue with the deficit based on a proportional weight, until each queue with the deficit has a credit.

In yet another embodiment, the present invention provides a packet scheduling method. The method includes storing at least one packet to be transmitted onto a link. The method further includes updating a credit or deficit value corresponding to each one of a plurality of queues as follows: For each queue having a corresponding credit value, when the packet length is greater than the credit value, subtracting the credit value from the packet length and replacing the credit value with the result, and when the packet length is less than or equal to the credit value, subtracting the packet length from the credit value and replacing the credit value with the result. For each queue having a corresponding deficit value, adding the deficit value to the packet length and replacing the deficit value with the result.

Another embodiment of the present invention provides a packet scheduling method, which includes polling a plurality of queues in a round robin fashion. The method further includes scheduling for transmission onto a link a packet in each queue with no deficit before scheduling for transmission onto the link a packet in each queue with a deficit. The method also provides allocating a credit to each queue with the deficit based on a proportional weight, until each queue with the deficit has a credit.

In a further embodiment, the present invention provides an apparatus for packet scheduling, including means for storing at least one packet to be transmitted onto a link. Also included are means for updating a credit or deficit value corresponding to each one of a plurality of queues as follows: For each queue having a corresponding credit value, when the packet length is greater than the credit value, subtracting the credit value from the packet length and replacing the credit value with the result, and when the packet length is less than or equal to the credit value, subtracting the packet length from the credit value and replacing the credit value with the result. For each queue having a corresponding deficit value, adding the deficit value to the packet length and replacing the deficit value with the result.

In another embodiment, the present invention provides an apparatus for packet scheduling, including means for polling a plurality of queues in a round robin fashion. The apparatus also includes means for schedule for transmission onto a link a packet in each queue with no deficit before scheduling for transmission onto the link a packet in each queue with a deficit. Also included are means for allocating a credit to each queue with the deficit based on a proportional weight, until each queue with the deficit has a credit.

Another embodiment of the present invention provides a computer program for execution on a processor for packet scheduling. The computer program includes code for storing at least one packet to be transmitted onto a link. The program further includes code for updating a credit or deficit value corresponding to each one of a plurality of queues as follows: For each queue having a corresponding credit value, when the packet length is greater than the credit value, subtracting the credit value from the packet length and replacing the credit value with the result, and when the packet length is less than or equal to the credit value, subtracting the packet length from the credit value and replacing the credit value with the result. For each queue having a corresponding deficit value, adding the deficit value to the packet length and replacing the deficit value with the result.

In yet another embodiment, the present invention provides a computer program for execution on a processor for packet scheduling. The computer program includes code for polling a plurality of queues in a round robin fashion and schedule for transmission onto a link a packet in each queue with no deficit before scheduling for transmission onto the link a packet in each queue with a deficit and allocating a credit to each queue with the deficit based on a proportional weight, until each queue with the deficit has a credit.

DETAILED DESCRIPTION OF THE INVENTION

Figure 1:
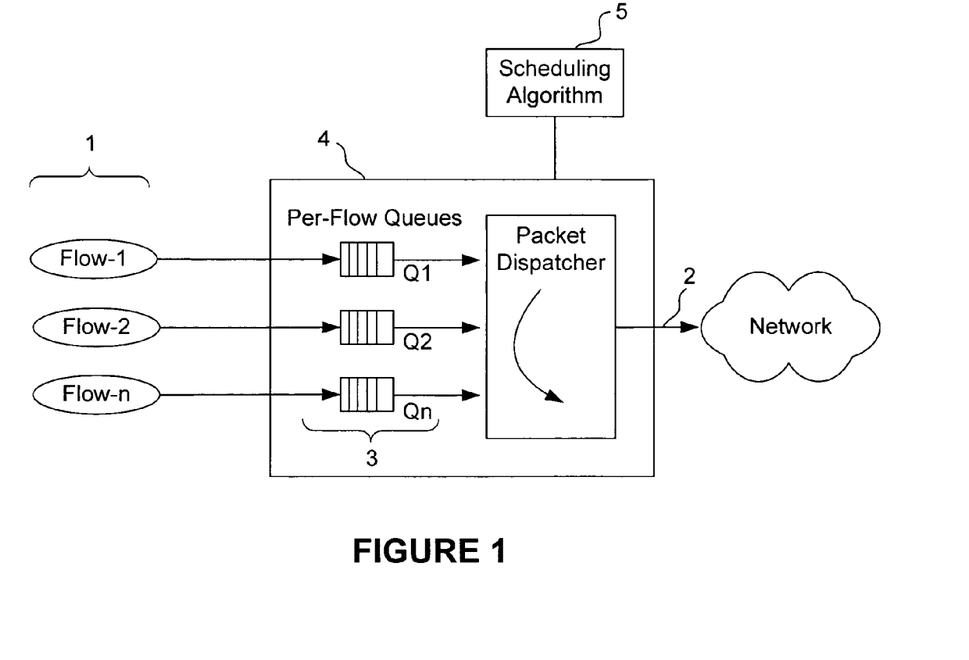
FIG. 1 is a block diagram of a round-robin packet scheduler in accordance with the present invention.

FIG. 1 illustrates a block diagram of a packet scheduler 4 in accordance with the present invention. The scheduling scenario considered here arises when a number of packet streams, called flows 1, share an output link at a switch. Each flow 1 maintains a separate queue 3 of its packets waiting for access to the transmission link 2. The packet scheduler 4 operates in accordance with a scheduling algorithm 5 to schedule the transmission of packets, so as to achieve a fair allocation of the bandwidth resources on the output link 2, reduce congestion and lower packet losses. The details of algorithm 5 are discussed in more detail below.

The packet scheduling algorithms can be realized in software recorded on a computer-readable storage medium. The invention could also be implemented on hardware, such as for example application specific integrated circuits (ASIC), programmable logic arrays (PLA), special purpose integrated circuits (ICs), digital signal processors (DSPs) or any other suitable logic devices, the constructions of which are all well known. For the sake of clarity, the algorithms of the present invention will be explained in part through the use of a pseudo code that resembles loosely C code. Such pseudo code will be readily understandable to those skilled in the art. As will be readily appreciated, any suitable programming language may be used. The routines described below can be run concurrently or sequentially.

Initially, structures are defined and the state of the ports are determined. A data structure is defined as:

$$\text{Sched} \qquad (1)$$

Sched is a data structure containing an array Queues[ ] and some other scheduling variables of a particular port. Each queue entry in the Queues[ ] array is another data structure containing information about the specific queue state. Hereinafter, the operator "→" is used to represent an access to a member of the structure. Thus, Sched→Queues[i] pertains to the data structure corresponding to the i'th queue. Each port has a "Sched" data structure, defined as port[n]→Sched, where "n" denotes the n'th port data structure. The discussion that follows applies to any port n. Accordingly, it is not necessary to show the order in which multiple ports n are processed. For simplification, the flowcharts and pseudo code below do not show which port n is being accessed.

Packets coming in on different flows are stored in different queues. The number of bytes added to each queue after every round of packet scheduling is defined as:

$$\text{Sched} \rightarrow \text{Queues}[t] \rightarrow \text{Weight} \qquad (2)$$

where Weight is the structure member storing the number of bytes credited to a particular queue t after a scheduling round is completed. Weight is used to differentiate the bandwidth guarantees of each queue. For instance, in a system with only two queues, if queue one had a weight of two and queue two had a weight of three, then the yield bandwidth of the link (i.e., port) for traffic assigned to queue one would be 40% and the yield bandwidth of the link for traffic assigned to queue two would be 60%. After each round, a queue will receive a credit that is directly proportional to its corresponding queue weight. The resolution of the credit depends on the desired bandwidth guarantee and is a design choice.

The state per port is defined as:

$$\text{Sched} \rightarrow \text{Queues}[t] \rightarrow \text{CreditCnt} \qquad (3)$$

$$\text{Sched} \rightarrow \text{Queues}[t] \rightarrow \text{Deficit} \qquad (4)$$

$$\text{Sched} \rightarrow \text{LastSelectedTC} \qquad (5)$$

A given queue may have a credit or deficit. CreditCnt is an accumulator, which stores a number representing the credit or deficit of a queue Sched→Queues[t]. Deficit is a one bit flag used to indicate whether the stored number is a credit or deficit, where zero indicates a credit and one indicates a deficit.

LastSelectedTC is a variable representing the last queue from which the packet scheduler has transmitted a packet onto a port. Thus, expression (5) represents the last scheduling operation in a round. The scheduler picks up a scheduling round from where it left off and schedules queues in a round-robin fashion. The process described below indexes queues in descending order (i.e., queue 8, queue 7, queue 6 ... queue 1). Queues could just as easily be indexed in ascending order instead.

In a preferred embodiment, the present invention is a modification of the deficit round robin (DRR) algorithm discussed above. DRR schedulers are work-conserving packet schedulers, meaning that at no point in time do packets exist in a queue without packets being transmitted onto a transmission link. Accordingly, the scheduler is calculating which packet to transmit next while another routine (not shown) is servicing scheduled packets simultaneously.

Figure 2:
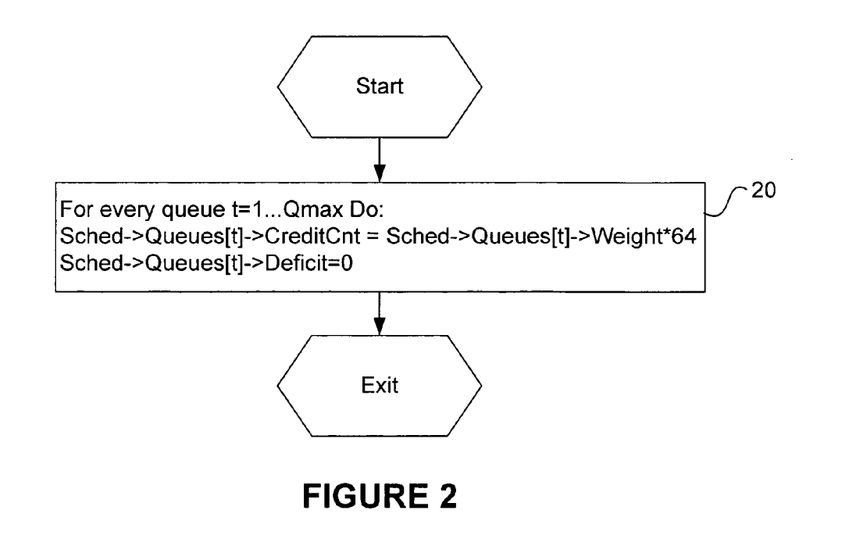
FIG. 2 is a flowchart of an initialization routine.
Figure 3A:
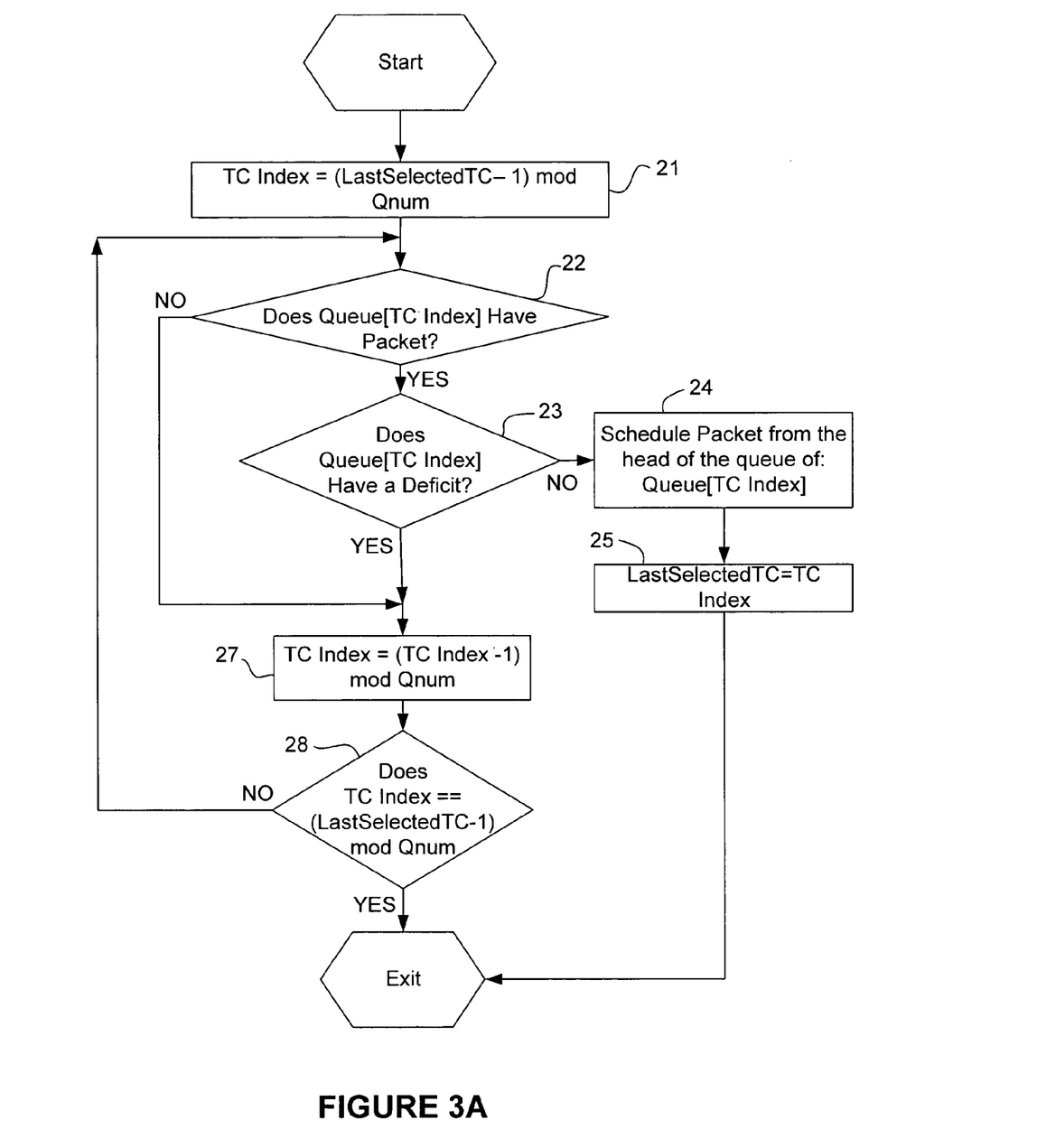
FIG. 3A is a flowchart of a routine that determines that the next packet to be scheduled is from a queue having no deficit.
Figure 3B:
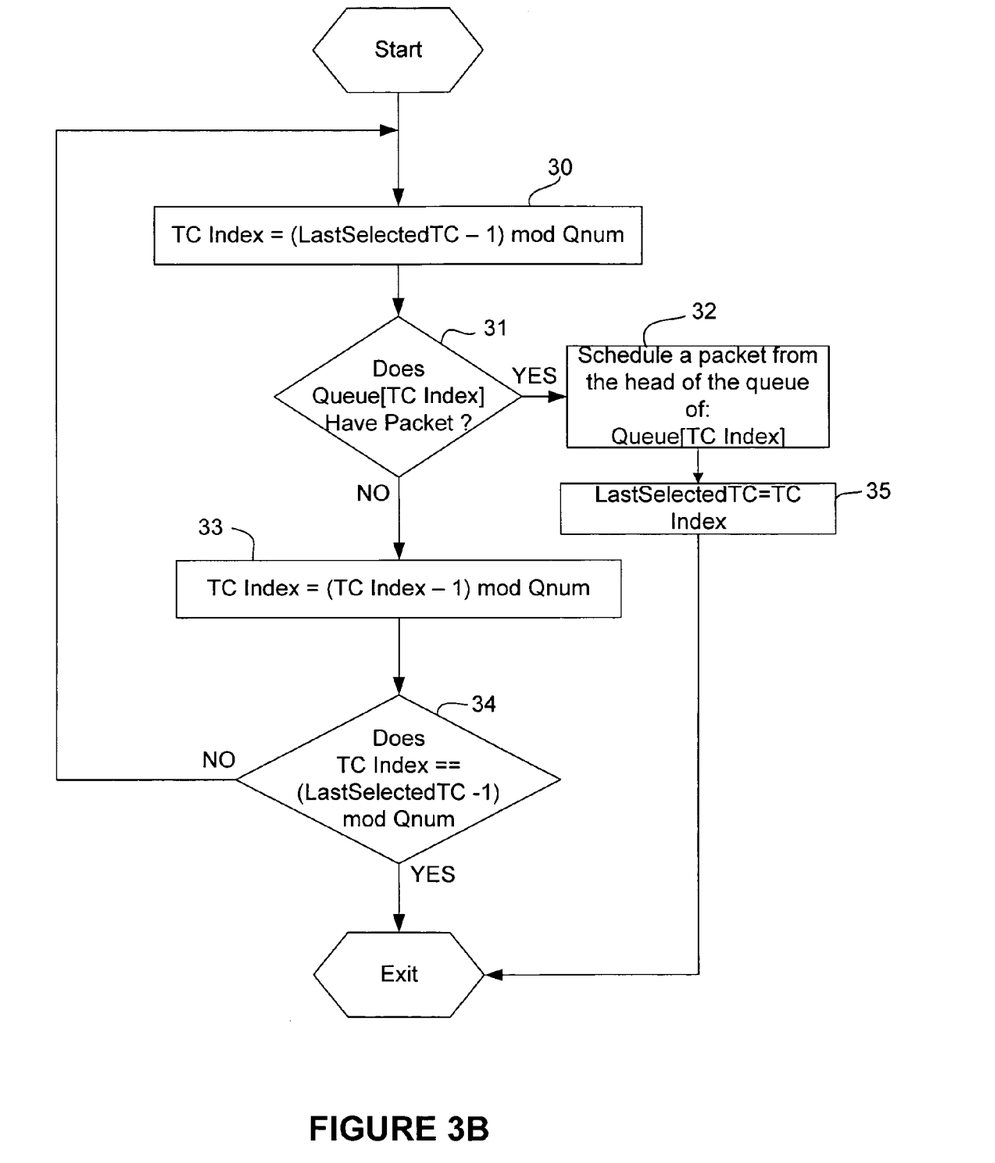
FIG. 3B is a flowchart of a routine that determines that the next packet to be scheduled which may have a deficit.

FIGS. 2, 3A and 3B are flowcharts of the routine that determines the next packet to be scheduled. As shown in FIG. 2 at step 20, the available credit per queue is initialized as follows:

$$\text{Sched} \rightarrow \text{Queues}[t] \rightarrow \text{CreditCnt} := \text{Sched} \rightarrow \text{Queues}[t] \rightarrow \text{Weight} * 64 \qquad (6)$$

$$\text{Sched} \rightarrow \text{Queues}[t] \rightarrow \text{Deficit} := 0 \qquad (7)$$

where the credit per-queue is CreditCnt and Deficit flag is set to credit. The weights for the queues can vary proportionally. For instance, the weights for eight queues can be 1:2:4:8:16:32:64:128, respectively. In the exemplary embodiment, the resolution of the weight is 64 bytes. Thus the initial credit for each queue is 64, 128, 256, 512, 1024, 2048, 4096, 8192 bytes, respectively. The proportions of the weights as well as their resolution are merely matters of design choice.

As packets are received, steps 21-28 determine which queues are not in a deficit state and schedule packets in those queues first. Preferably, packets in queues with credits are scheduled before packets in queues with deficits.

Queues are scheduled in a round-robin fashion each queue being indexed by TC Index, as shown in step 21. TC Index is defined as:

$$\text{TC Index} = (\text{LastSelectedTC} - 1) \bmod \text{Qnum} \qquad (8)$$

where LastSelectedTC represents the last queue selected and Qnum denotes the number of queues. Step 22 determines whether the queue has a packet, and if so, step 23 determines whether the queue has a deficit. If the determination in step 23 is negative, then the packet is scheduled for delivery in step 24. The last-queue-selected variable, LastSelectedTC, is then updated in step 25. If Step 22 determines that the queue does not have a packet, or at step 23 a determination is made that the queue has a deficit, then at step 27, TC Index is redefined as:

$$\text{TC Index} = (\text{TC Index} - 1) \bmod \text{Qnum} \qquad (9)$$

Step 28 determines whether the last queue in a round has been processed using the following test:

$$\text{TC Index} \times (\text{LastSelectedTC} - 1) \bmod \text{Qnum} \qquad (10)$$

If step 28 determines that the last queue has been processed, the procedure returns to the process from which it originated. Alternatively, the procedure can proceed directly to the routine discussed below with respect to FIG. 3B. If the last queue has not been processed then the routine proceeds to step 22 to continue testing the rest of the queues.

The steps discussed above with respect to FIG. 3A are shown in the pseudo code that follows:

If Sched→Queues[LastSelectedTC-1] has a packet and Sched→Queues[LastSelectedTC-1]→Deficit is 0, then
   TransmitFromQ(Sched→Queues[LastSelectedTC-1]);
   Sched→LastSelectedTC:=Sched→LastSelectedTC-1;

else If Sched→Queues[LastSelectedTC-2] has a packet and Sched→Queues[LastSelectedTC-2]→Deficit is 0
   TransmitFromQ(Sched→Queues[LastSelectedTC-2]);
   Sched→LastSelectedTC:=Sched→LastSelectedTC-2.

. . . .

. . . .

else If Sched→Queues[LastSelectedTC] has a packet and Sched→Queues[LastSelectedTC]→Deficit is 0, then
   TransmitFromQ(Sched→LastSelectedTC);

Up to this point, the process schedules queues that are not in a deficit state and have packets ready to be scheduled for transmission. A failure of any of the previous queries means that either a particular queue has no packet (i.e., all the queues are empty and there is nothing to schedule) or that the queue is in a deficit state.

FIG. 3B is a flowchart of the routine that determines the next packet to be scheduled when the queue storing that packet has a deficit. As mentioned above, the routine in FIG. 3B may be run sequentially after the routine discussed above with respect to FIG. 3A or concurrently therewith. At step 30 the queue index, TC Index, is defined as described above with respect to definition (9). Step 31 determines which queue has a packet by testing a queue in the Queue[ ] array. Once found, the packet in the queue is scheduled for delivery at step 32.

The last-queue-selected variable, LastSelectedTC, is then updated in step 35 and the routine exits. Queues in this routine are scheduled in a round-robin fashion. If a packet is not in the selected queue, then the last queue selected variable, TC Index, is updated in step 33 as described above with respect to definition (9). Eventually step 34 will determine that the last queue in a round has been processed. After the last queue is processed, the procedure returns to the process from which it originated. If the last queue has not been process, the procedure returns to step 30.

The steps discussed above with respect to FIG. 3B are shown in the pseudo code that follows:

else if Sched→Queues[LastSelectedTC-1] has a packet
    TransmitFromQ(Sched→LastSelectedTC-1);
    Sched→LastSelectedTC:=Sched→LastSelectedTC-1 else if Sched→Queues[LastSelectedTC-2] has a packet
    TransmitFromQ(Sched→Queues[LastSelectedTC-2]);
    Sched→LastSelectedTC:=Sched→LastSelectedTC-2

. . . .

. . . .

Figure 4:
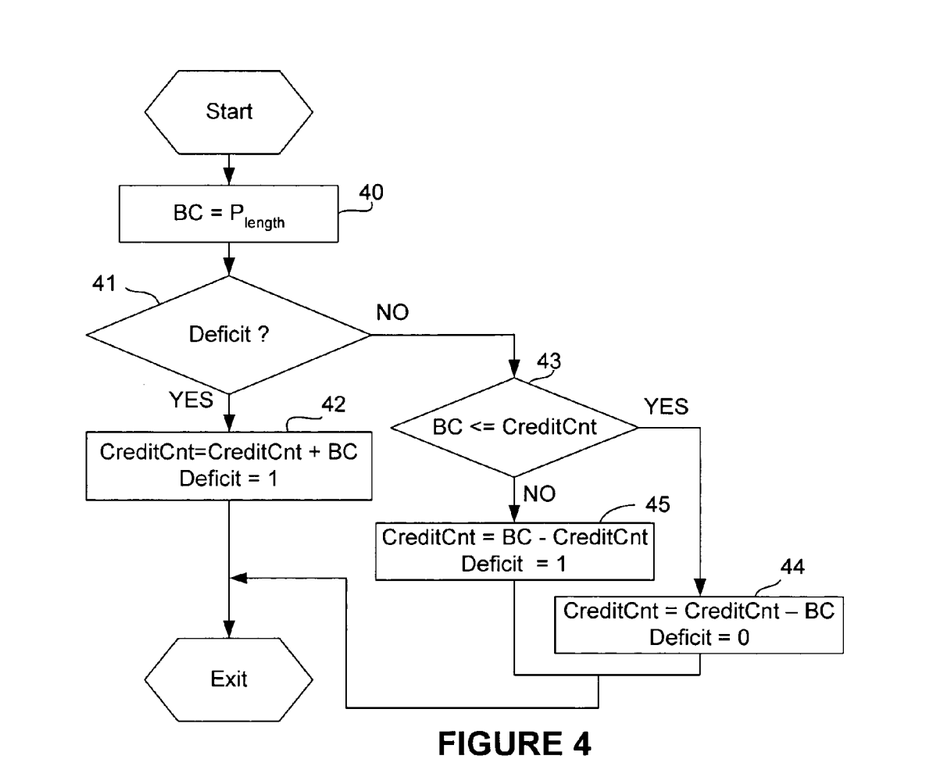
FIG. 4 is a flowchart of a routine that determines a credit to assign each queue based on packet length.

. . . .

else If Sched→Queues[LastSelectedTC] has a packet
    TransmitFromQ(Sched→Queues[LastSelectedTC]);

FIG. 4 is a flowchart of the routine that determines the credit to assign each queue based on packet length. This procedure is invoked when a packet ("P") is actually transmitted. This procedure can run on every port in the system, and in the context of the specific queue from which the packet is dequeued.

All the variables explained below with respect to FIG. 4 are part of the same port. Accordingly, as one of ordinary skill in the art will understand, for brevity only the elements of the structure Sched→Queue are shown. Every packet that gets scheduled causes the queue credit count, CreditCnt, to be updated. Once the packet has been dequeued for transmission, the packet length is defined at step 40. As explained above, since the notion of negative numbers does not exist, the deficit is accumulated and an indication that the port is in deficit (i.e., that the credit counter is in fact a negative number) is made by setting the Deficit flag to one; to indicate a credit (i.e., positive number) Deficit is set to zero. Step 41 determines whether a queue is in a deficit or credit state. If a queue is in deficit then credit equals the current credit in a queue plus the length of the packet that is ready for transmission, as shown in step 42. After the credit is calculated the procedure returns. If no Deficit exists, then a determination is made in step 43 whether the length of the packet is larger than the current credit for a queue (i.e., BC<=CreditCnt). If the packet length is larger, then the credit for the queue is subtracted from the packet length of the received packet, as shown at step 45. Since the queue is now in a deficit, the Deficit flag is set to one. If a determination is made at step 43 that the byte count is less than or equal to the current credit for the queue, then at step 44 the byte count is subtracted from the current credit. Since the queue is not in a deficit state, the Deficit flag stays set to zero indicating the current credit.

The steps discussed above with respect to FIG. 4 are shown in the pseudo code that follows, where index "t" represents the queue that was just scheduled for transmission:

If (Sched→Queues[t]→Deficit=1)
    Sched→Queues[t]→CreditCnt:=Sched→Queues[t]→CreditCnt+BC
    Sched→Queues[t]→Deficit:=1 else if BC>Sched→Queues[t]→CreditCnt
    Sched→Queues[t]→CreditCnt:=BC-Sched→Queues[t]→CreditCnt
    Sched→Queues[t]→Deficit=1 else
    Sched→Queues[t]→CreditCnt:=Sched→Queues[t]→CreditCnt-BC
    Sched→Queues[t]→Deficit:=0

Since a port link cannot be idle, packets must be transmitted—even if the queues have a deficit. In the present invention, a cycle has ended when all queues that have packets for transmission have a deficit (i.e., Sched→Queues[t]→Deficit is 1). Once all queues are in deficit, the queue credit counts are calculated and updated in a round-robin fashion. The updating continues until at least one queue has no deficit (i.e., Deficit=0). The scheduler discussed above with respect to FIGS. 2, 3A and 3B can then schedule for transmission any packets in queues with no deficit first.

Figure 5:
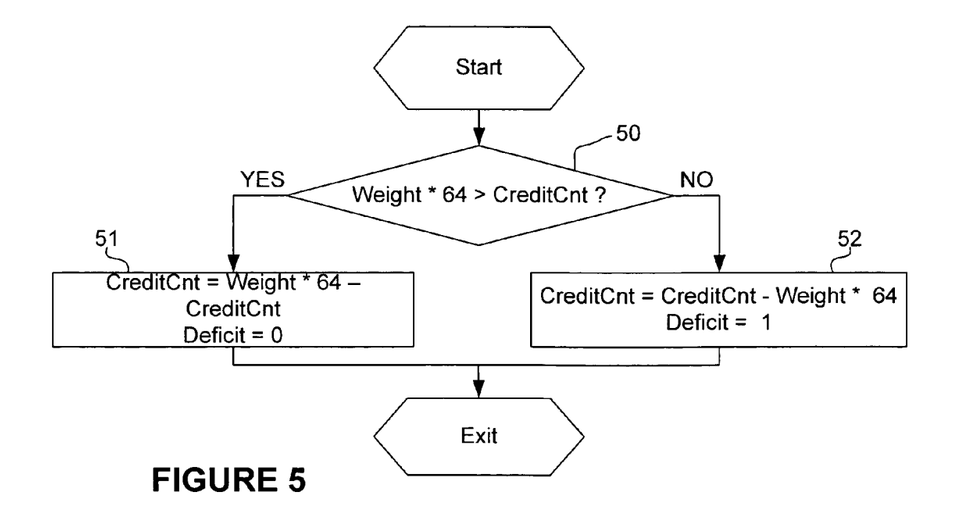
FIG. 5 is a flowchart of a routine that determines a credit to assign each queue having a packet ready to be transmitted and a deficit.

FIG. 5 is a flowchart of the routine that determines the credit to assign every queue having a packet ready to be transmitted and a deficit. When all the queues that have packets for transmission and their corresponding queues are in deficit (i.e., Deficit=1) new credits are calculated based on the weights assigned to each queue as follows. In step 50, a determination is made whether the weight assigned to a queue multiplied by its resolution (e.g., 64 bytes) is greater than the existing credit for a queue. If so, then in step 51 the new credit becomes the existing credit subtracted from the weight of the queue multiplied by its resolution and the deficit flag is set to zero indicating that the queue now has a credit. If not, then in step 52 the new credit becomes the existing credit minus the queue weight multiplied by its resolution. Since a deficit still exists, the Deficit flag remains set to one. As with the routines discussed above, the aforementioned routine discussed with respect to FIG. 5 can be processed in parallel to the others.

The steps discussed above with respect to FIG. 5 are shown in the pseudo code that follows, where Index "t" represents the specific queue that its credit is being updated:

If (Sched→Queues[t]→Weight*64>Sched→Queues[t]→CreditCnt.)
    Sched→Queues[t]→CreditCnt:=Sched→Queues[t]→Weight*64-Sched→Queues[t]→CreditCnt
    Sched→Queues[t]→Deficit=0 else
    Sched→Queues[t]→CreditCnt:=Sched→Queues[t]→CreditCnt-Sched→Queues[t]→Weight*64
    Sched→Queues[t]→Deficit=1

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A packet scheduling device, comprising:
    a plurality of queues, each queue including at least one packet to be transmitted onto a link;
    a processor, coupled to the plurality of queues; and
    a plurality of programming instructions stored on a computer-readable storage medium, wherein the plurality of programming instructions, if executed by the processor, enable the processor to update a credit or deficit value corresponding to each queue in response to transmission of the at least one packet from each queue, by for each queue having a corresponding credit value,
when the packet length is greater than the credit value, subtracting the credit value from the packet length and replacing the credit value with the result, and
when the packet length is smaller than the credit value, subtracting the packet length from the credit value and replacing the credit value with the result; and for each queue having a corresponding deficit value, adding the deficit value to the packet length and replacing the deficit value with the result.

2. A packet scheduling device according to claim 1, wherein the logic is further configured to cause the processor to schedule for transmission at least one packet ready to be transmitted.

3. A packet scheduling device according to claim 2, wherein the logic is further configured to cause the to poll the plurality of queues in a round robin fashion for the at least one packet.

4. A packet scheduling device according to claim 1, wherein the credit and deficit values are unsigned integers and a plurality of binary flags corresponding to each queue indicate the sign of each value.

5. A packet scheduling device according to claim 1, wherein the logic is further configured to cause the processor to replace a deficit value, wherein, in the case a predetermined weight multiplied by a resolution factor is greater than the deficit value, subtracting the deficit value from the weight multiplied by the resolution factor to produce a result and replacing the deficit value with the result, wherein the result is now a credit value, and in the case the predetermined weight multiplied by a resolution factor is less than the deficit value, subtracting the predetermined weight multiplied by the resolution factor from the deficit value and replacing the deficit value with the result, wherein the result is a new deficit value.

6. A packet scheduling device according to claim 5, wherein the credit and deficit values are unsigned integers and a plurality of binary flags corresponding to each queue indicate the sign of each value.

7. A network system comprising the packet scheduling device of claim 1.

8. A packet scheduling method, comprising:
providing, by a hardware packet scheduling device, at least one packet to be transmitted onto a link;
updating, by the hardware packet scheduling device, a credit or deficit value corresponding to each one of a plurality of queues in response to transmission of the stored at least one packet, by
for each queue having a corresponding credit value,
when the packet length is greater than the credit value, subtracting the credit value from the packet length and replacing the credit value with the result, and
when the packet length is less than or equal to the credit value, subtracting the packet length from the credit value and replacing the credit value with the result; and
for each queue having a corresponding deficit value, adding the deficit value to the packet length and replacing the deficit value with the result.

9. A packet scheduling method according to claim 8, further comprising: scheduling, by the packet scheduling device, for transmission at least one packet ready to be transmitted.

10. A packet scheduling method according to claim 9, further comprising: polling, by the packet scheduling device, the plurality of queues in a round robin fashion for the at least one packet.

11. A packet scheduling method according to claim 8, wherein the credit and deficit values are unsigned integers and a plurality of binary flags corresponding to each queue indicate the sign of each value.

12. A packet scheduling method according to claim 8, further comprising:
replacing, by the packet scheduling device, a deficit value, wherein, in the case a predetermined weight multiplied by a resolution factor is greater than the deficit value, subtracting the deficit value from the weight multiplied by the resolution factor to produce a result and replacing the deficit value with the result, wherein the result is now a credit value, and in the case the predetermined weight multiplied by a resolution factor is less than the deficit value, subtracting the predetermined weight multiplied by the resolution factor from the deficit value and replacing the deficit value with the result, wherein the result is a new deficit value.

13. A packet scheduling method according to claim 12, wherein the credit and deficit values are unsigned integers and a plurality of binary flags corresponding to each queue indicate the sign of each value.

14. An apparatus for packet scheduling, comprising:
means for providing at least one packet to be transmitted onto a link;
means for updating a credit or deficit value corresponding to each one of a plurality of queues in response to transmission of the at least one packet, by
for each queue having a corresponding credit value,
when the packet length is greater than the credit value, subtracting the credit value from the packet length and replacing the credit value with the result, and
when the packet length is less than or equal to the credit value, subtracting the packet length from the credit value and replacing the credit value with the result; and
for each queue having a corresponding deficit value, adding the deficit value to the packet length and replacing the deficit value with the result.

15. An apparatus according to claim 14, further comprising: means for scheduling for transmission at least one packet ready to be transmitted.

16. An apparatus according to claim 15, further comprising: means for polling the plurality of queues in a round robin fashion for the at least one packet.

17. An apparatus according to claim 14, wherein the credit and deficit values are unsigned integers and a plurality of binary flags corresponding to each queue indicate the sign of each value.

18. An apparatus according to claim 14, further comprising:
means for replacing a deficit value, wherein, in the case a predetermined weight multiplied by a resolution factor is greater than the deficit value, subtracting the deficit value from the weight multiplied by the resolution factor to produce a result and replacing the deficit value with the result, wherein the result is now a credit value, and in the case the predetermined weight multiplied by a resolution factor is less than the deficit value, subtracting the predetermined weight multiplied by the resolution factor from the deficit value and replacing the deficit value with the result, wherein the result is a new deficit value.

19. An apparatus according to claim 18, wherein the credit and deficit values are unsigned integers and a plurality of binary flags corresponding to each queue indicate the sign of each value.

20. A network system comprising the apparatus of claim 14.

21. A computer program for execution on a processor for packet scheduling, the computer program comprising code for:
- providing at least one packet to be transmitted onto a link;
- updating a credit or deficit value corresponding to each one of a plurality of queues in response to transmission of the at least one packet, by
  - for each queue having a corresponding credit value,
    - when the packet length is greater than the credit value, subtracting the credit value from the packet length and replacing the credit value with the result, and
    - when the packet length is less than or equal to the credit value, subtracting the packet length from the credit value and replacing the credit value with the result; and
  - for each queue having a corresponding deficit value, adding the deficit value to the packet length and replacing the deficit value with the result.

22. A computer program according to claim 21, further comprising code for: scheduling for transmission at least one packet ready to be transmitted.

23. A computer program according to claim 22, further comprising code for: polling the plurality of queues in a round robin fashion for the at least one packet.

24. A computer program according to claim 21, wherein the credit and deficit values are unsigned integers and a plurality of binary flags corresponding to each queue indicate the sign of each value.

25. A computer program according to claim 21, further comprising code for:
- replacing a deficit value, wherein, in the case a predetermined weight multiplied by a resolution factor is greater than the deficit value, subtracting the deficit value from the weight multiplied by the resolution factor to produce a result and replacing the deficit value with the result, wherein the result is now a credit value, and in the case the predetermined weight multiplied by a resolution factor is less than the deficit value, subtracting the predetermined weight multiplied by the resolution factor from the deficit value and replacing the deficit value with the result, wherein the result is a new deficit value.

26. A computer program according to claim 25, wherein the credit and deficit values are unsigned integers and a plurality of binary flags corresponding to each queue indicate the sign of each value.

27. A network system executing the computer program of claim 21.

\* \* \* \* \*

UNITED STATES PATENT AND TRADEMARK OFFICE
CERTIFICATE OF CORRECTION

PATENT NO. : 7,646,717 B1
APPLICATION NO. : 10/977245
DATED : January 12, 2010
INVENTOR(S) : Anker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1355 days.

Signed and Sealed this

Sixteenth Day of November, 2010

David J. Kappos
*Director of the United States Patent and Trademark Office*